United States Patent [19]
Robinson

[11] Patent Number: 6,014,486
[45] Date of Patent: Jan. 11, 2000

[54] BEVELED FIBER OPTICAL TAP FOR USE WITH BULK OPTIC DEVICES

[75] Inventor: Kevin Cyrus Robinson, Upper Milford Township, Lehigh County, Pa.

[73] Assignee: Lucent Technologies, Inc., Murray Hill, N.J.

[21] Appl. No.: 08/920,232

[22] Filed: Aug. 25, 1997

[51] Int. Cl.[7] .................................................. G02B 6/26
[52] U.S. Cl. ............................................................ 385/48
[58] Field of Search ................................ 385/45, 49, 116, 385/25, 115, 89, 94, 88; 356/73.1, 141.5

[56] References Cited

U.S. PATENT DOCUMENTS 4,130,343  12/1978  Miller et al. ................................ 385/88
4,741,615  5/1988  Calzavara et al. ...................... 356/73.1

*Primary Examiner*—Akm E. Ullah

[57] ABSTRACT

An optical tap is disclosed that may be utilized with bulk optic devices. The optical tap utilizes any pre-existing reflected optical signal that is present in the conventional bulk optic device. The tap includes a beveled fiber stub that is inserted in the path of the reflected optical signal and thus captures this reflected signal, where the bevel is utilized to allow for the reflected signal to be re-directed through the fiber stub. A convention photodetector is coupled to the fiber stub and used to generate an electrical control signal from the captured reflected optical signal.

4 Claims, 1 Drawing Sheet

BEVELED FIBER OPTICAL TAP FOR USE WITH BULK OPTIC DEVICES

BACKGROUND OF THE INVENTION

1. Technical Field

The present invention relates to an optical tap for use with bulk optic devices and, more particularly, to an optical tap that may be included within a conventional optical subassembly and advantageously utilize pre-existing optical reflections as the light source for the optical tap.

2. Description of the Prior Art

In many optical subassemblies it is necessary to include an optical tap to monitor the performance of the subassembly. In most cases, the tap introduces additional optical components into the subassembly. For example, a grating, prism or partially reflecting mirror is added to the subassembly and functions to optically "tap" a portion of the light signal passing through the subassembly. While such an arrangement is useful in extracting a portion of the light signal, the introduction of additional optics adds to the cost and complexity of the overall subassembly. Further, the introduction of additional optics results in attenuating the optical signal passing through the subassembly.

SUMMARY OF THE INVENTION

The limitations in conventional optical taps as discussed above are overcome by the present invention, which relates to an optical tap for use with bulk optic devices and, more particularly, to an optical tap that may be included within a conventional optical subassembly and advantageously utilize pre-existing optical reflections as the light source for the optical tap.

In accordance with the teachings of the present invention, a fiber stub is inserted in the path of a pre-existing optical reflection within a bulk optic device (such as an optical isolator) where the fiber stub is beveled so as to capture the reflection and redirect the reflected signal through the fiber stub. The fiber stub is coupled to an electronic detector, for example, a p-i-n photodetector. The electronic output signal from the detector can then be utilized to monitor the performance of the bulk optic device and provide feedback accordingly.

In one embodiment of the present invention the fiber stub is fitted within a retainer formed to surround the bulk optic device, where the retainer is also formed to hold the photodetector on the exterior surface of the bulk optic device. Advantageously, the inclusion of the tap of the present invention requires only that the fiber stub be located in the path of an optical reflection, the photodetector can be located beyond the periphery of the bulk optic device.

It is an aspect of the present invention that the fiber stub may be adjusted within the path of the reflected signal during initial operation so as to "tune" the reflection and provide the optimum reflected signal level into the photodetector. In accordance with the teachings of the present invention, any suitable optical reflection may be utilized, where it is known that several optical components included in bulk optic devices provide a small degree of reflection (e.g., rutile wedges, wavelength division multiplexers, rotators, etc.). Thus, there is no need to include an additional "reflection" element in the arrangement of the present invention.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
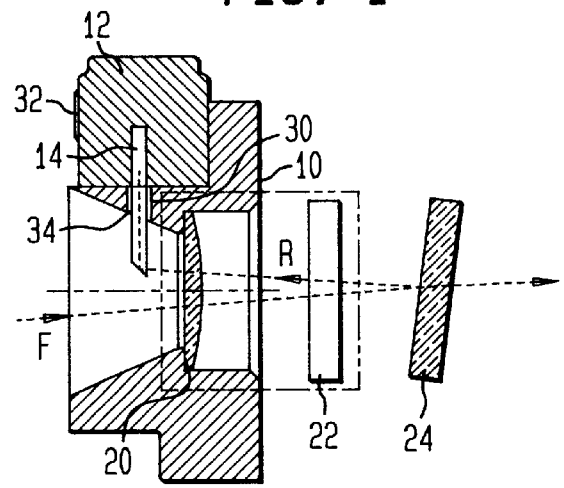
FIG. 1 illustrates a portion of a convention optical isolator including the optical tap of the present invention.

A portion of an exemplary bulk optic device (in this case, an optical isolator) including the optical tap of the present invention is illustrated in FIG. 1. The optical tap includes a housing 10, a photodetector assembly 12 and a fiber stub 14. The exemplary optical isolator includes a lens 20, a wavelength division multiplexer 22 and reflector 24. In the normal operation of a conventional isolator, the optical signal will traverse the forward direction path indicated as "F" in FIG. 1. A relatively small portion of the optical signal, when it impinges reflector 24, will follow the return path R as shown. In an exemplary embodiment, such as that illustrated in FIG. 1, a reflector designed to return only a 20 dB portion of the optical signal may be used. As shown, reflector 24 is tilted at an angle of approximately 7 with respect to the perpendicular of the optical axis. This tilt is sufficient to allow for the reflected optical signal to traverse a path off-axis from the forward traveling optical signal.

Figure 2:
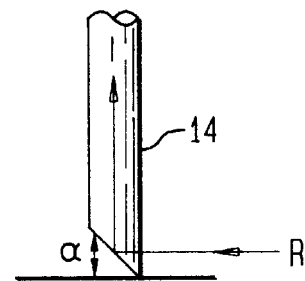
FIG. 2 contains an enlargement of an exemplary fiber stub used in the present invention.

In accordance with the teachings of the present invention, the reflected optical signal, denoted R in FIG. 1, will travel back through multiplexer 22 and lens 20 and thereafter enter fiber stub 14. As clearly depicted in FIG. 2, fiber stub 14 is beveled at a predetermined angle ox sufficient to capture all of the reflected optical signal R and re-direct reflected signal R through the length of fiber stub 14. In particular, a 45° bevel may be used. Reflected optical signal R is thereafter utilized as the optical input to a conventional photodetector 12, such as a p-i-n photodiode, to generate an electrical control signal that may be utilized to monitor the operation of the bulk optic device. In this case, to monitor the performance of the optical isolator.

Figure 3:
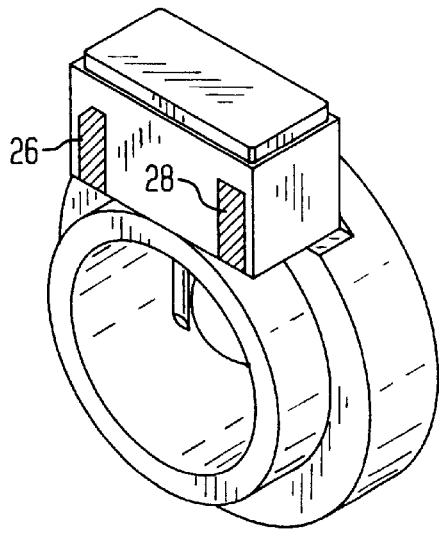
FIG. 3 illustrates an exemplary housing for the combination of the fiber stub and electronic photodetector of the present invention.

FIG. 3 contains an isometric view of the combination of retainer 10, photodetector 12 and fiber stub 14. Advantageously, retainer 10 may be formed so as to encircle a conventional isolator housing and therefore eliminate the need to re-design the entire optical device to add the tap arrangement. Also visible in this view of the invention are the electrical contact areas 26 and 28 formed on the outer surface of photodetector 12. A conventional pair of electrical leads may be attached to contact areas 26 and 28 and used to provide the control signal output to the associated control circuitry (not shown).

Figure 4:
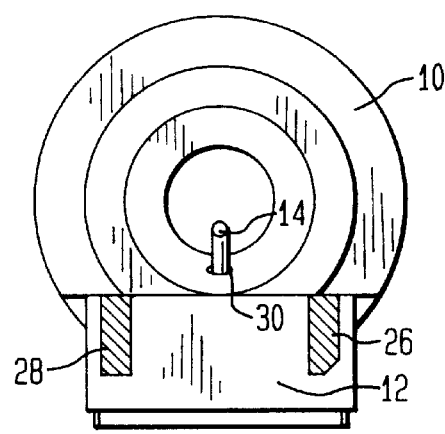
FIG. 4 contains an isometric view of an exemplary optical tap formed in accordance with the present invention.

As mentioned above, it is a particular attribute of the present invention that the opening 30 in housing 10 through which fiber stub 14 must pass may be designed so as to allow for fiber stub 14 to be moved back and forth until an optimum amount of reflected signal is captured. FIG. 4 is an isometric view of an exemplary optical tap that clearly illustrates opening 30. Once the optimum position is obtained, fiber stub 14 may be fixed in place.

Various other modifications and arrangements of the present invention will be apparent to those skilled in the art and are considered to fall within the scope of the present invention. For example, the tap assembly of the present invention may be used with a variety of bulk optic devices, including mutliplexers, regenerators, amplifiers, and the like. The only requirement being that the bulk optic device include an optical surface capable of producing an optical reflection.

What is claimed is:

1. An optical tap for use with a bulk optic device, said bulk optic device capable of producing a reflected optical signal, said optical tap comprising an optical fiber stub including a beveled endface, said optical fiber stub disposed such that the reflected optical signal impinges said beveled endface and thereafter propagates along said optical fiber stub; and a photodetector coupled to said optical fiber stub for translating said reflected optical signal into an electrical signal, said electrical signal thereafter utilized to control the operation of said bulk optic device.

2. An optical tap as defined in claim 1 wherein said tap includes a retainer disposed to surround the bulk optic device, said retainer including an aperture to allow for the fiber stub to pass therethrough, the photodetector being disposed to attach to said housing.

3. An optical tap as defined in claim 2 wherein the retainer aperture is configured to allow for the fiber stub position to be adjusted so as to obtain maximum coupling of the reflected optical signal.

4. An optical tap as defined in claim 1 wherein the fiber stub endface is beveled at an angle of approximately 45 degrees.

* * * * *